(12) United States Patent
Sabhapathy (10) Patent No.: US 8,961,130 B2
(45) Date of Patent: Feb. 24, 2015

(54) COOLING AND CLIMATE CONTROL SYSTEM AND METHOD FOR AN OFFSHORE WIND TURBINE

(75) Inventor: Peri Sabhapathy, Northville, MI (US)

(73) Assignee: Gamesa Innovation & Technology, S.L., Sarriguren (ES)

( * ) Notice: Subject to any disclaimer, the term of this patent is extended or adjusted under 35 U.S.C. 154(b) by 854 days.

(21) Appl. No.: 13/152,783

(22) Filed: Jun. 3, 2011

(65) Prior Publication Data

US 2012/0308383 A1    Dec. 6, 2012

(51) Int. Cl.
*F03D 11/00* (2006.01)
*F03D 11/04* (2006.01)

(52) U.S. Cl.
CPC .............. *F03D 11/00* (2013.01); *F05B 2260/20* (2013.01); *Y02E 10/722* (2013.01); *Y02T 50/675* (2013.01); *Y02E 10/726* (2013.01); *Y10S 416/06* (2013.01)
USPC .......... 416/1; 416/95; 416/244 R; 416/244 A; 416/DIG. 6; 415/121.2; 415/175; 415/176; 415/177; 290/55

(58) Field of Classification Search
USPC ...................... 415/2.1, 3.1, 4.1–4.5, 905–909, 415/175–178, 121.2, 1; 416/1, 95, 244 R, 416/244 A, DIG. 4, DIG. 6, DIG. 8; 290/44, 290/55
See application file for complete search history.

(56) References Cited

U.S. PATENT DOCUMENTS

| | | | | |
|---|---|---|---|---|
| 1,699,949 | A  * | 1/1929 | Bucklen | .......................... 290/55 |
| 6,439,832 | B1 | 8/2002 | Siegfriedsen | |
| 6,520,737 | B1 | 2/2003 | Fischer et al. | |
| 7,111,668 | B2 | 9/2006 | Rurup | |
| 7,837,126 | B2 | 11/2010 | Gao | |
| 2005/0275225 | A1* | 12/2005 | Bertolotti | ........................ 290/44 |
| 2009/0289461 | A1 | 11/2009 | Larsen | |
| 2010/0061853 | A1 | 3/2010 | Bagepalli | |

FOREIGN PATENT DOCUMENTS

| | | |
|---|---|---|
| CA | 2 714 839 A1 | 3/2011 |
| WO | 2010/069954 A1 | 6/2010 |

* cited by examiner

*Primary Examiner* — Christopher Verdier
(74) *Attorney, Agent, or Firm* — Ladas & Parry LLP (57) ABSTRACT

A system and method to cool the air inside the nacelle and the heat generating components, particularly of an offshore wind turbine is presented. The ambient air first enters an air handling unit near the tower bottom where the airborne water droplets and salt particles are removed. The clean air is then compressed adiabatically, thus increasing the dew point temperature of the water vapor in the air. The high pressure, high temperature air from the compressor is then cooled and dehumidified in a sea water-to-air heater exchanger or an air-to-air heat exchanger. The high pressure air from the heat exchanger then enters the turbine at the tower bottom and flows up to the nacelle where it is allowed to expand adiabatically in a duct. The duct helps direct the resulting cold air over the heat generating components. The cold air can also used to cool these components internally. The warm air ultimately exits the nacelle at the rear top.

18 Claims, 6 Drawing Sheets

COOLING AND CLIMATE CONTROL SYSTEM AND METHOD FOR AN OFFSHORE WIND TURBINE

BACKGROUND OF THE INVENTION

1. Field of the Invention

The present invention generally relates to systems and methods for cooling and climate control of an offshore wind turbine, and more particularly to systems and methods to cool the air inside the nacelle and the heat generating components of an offshore wind turbine, such as the drivetrain, the electrical generator, the converter, and the transformer. It is noted that although the wind turbine cooling and climate control system of the present invention is preferably directed to an offshore installation, it can also be used in an onshore installation.

2. Related Art

A wind turbine converts the kinetic energy of the wind into electrical energy through its rotor, drivetrain, electrical generator, and converter. An electrical transformer converts the low voltage output from the converter into a high voltage output before the output is sent to the substation at the wind farm. The wind turbine nacelle houses these mechanical and electrical components, namely, the drivetrain, the electrical generator, the converter and the transformer (usually located in the nacelle to reduce the power loss due to low voltage electrical transmission). The nacelle also houses the components of the hydraulic system needed for blade pitching and nacelle yawing.

These components generate a significant amount of heat while the wind turbine is operating. For their protection and their efficient operation, the heat generated by these components has to be continuously removed. This is typically done by circulating a coolant such as a mixture of ethylene glycol and water through the heat exchangers built into these components. The coolant then transports the heat from these components and dissipates it to the ambient air with the help of air-cooled radiators mounted on the outside of the nacelle.

In addition to dissipating heat to the coolant, the heat generating components of the wind turbine also dissipate a significant amount of heat from their outer surfaces to the air inside the nacelle. Moreover, components such as the transformer dissipate the heat primarily to the surrounding air. Thus, the air inside the nacelle needs to be either continuously replaced by fresh cooler air (an open airflow system) or cooled and re-circulated (a closed airflow system).

In a wind turbine with an open airflow system, the cooler ambient air usually enters through one or more inlets at the nacelle bottom and flows through the nacelle, thus removing heat from the outer surfaces of the heat generating components. The warmer air exits the nacelle to the outside through one or more outlets at the nacelle top. The fans, typically located either at the inlets or the outlets, and other airflow control devices such as vanes help regulate the airflow through the nacelle and, thus, over the heat generating components.

In a turbine with a closed airflow system, the warmer air inside the nacelle is transported to outside the nacelle or to the tower bottom and cooled through a chiller or through an air-to-air heat exchanger and the cooler air is re-circulated through the nacelle. Fans or blowers and other flow control devices help circulate and regulate the airflow through the nacelle.

Thus, the wind turbine climate control system (a general term that refers to all the components associated with the airflow and maintaining the air temperature) helps cool the heat generating components of the turbine by regulating the nacelle air temperature. An open airflow system is typically more economical and simpler to use than a closed airflow system, and, therefore, it is generally used in onshore wind turbines.

SUMMARY OF THE INVENTION

The relative humidity of the ambient air is typically very high in an offshore environment. Moreover, the air carries with it small water droplets and salt particles. This can pose a major problem for an offshore wind turbine cooled with an open airflow system because the corrosion rate of the components inside the turbine increases exponentially with the relative humidity of air inside the turbine. The component corrosion rate is exasperated when the salt content of the air is also high. That is the reason the International Electrotechnical Commission (IEC), the international body that sets the standards for the wind turbines worldwide, recommends that the relative humidity of the air inside the offshore wind turbine should be less than 70%. Therefore, it is imperative to remove the water droplets and the salt particles from the ambient air and to lower its relative humidity before the air enters the turbine to avoid electrical short circuits and minimize the component corrosion. Thus, the climate control system of an offshore wind turbine needs to maintain not only the temperature but also the relative humidity of air inside the turbine.

Locating the air treatment equipment of an offshore wind turbine on the nacelle may interfere both with the platform to land the service personnel from the helicopter and with the service crane. Therefore, it is easier and more practical to locate the air treatment equipment at the tower bottom. This also helps lower the nacelle weight. However, for capturing the maximum energy from the wind, the nacelle is continually rotated about a vertical axis (yaw motion) so that the blades are oriented towards the wind direction. This can interfere with the transportation of clean cold air from the tower bottom to the nacelle.

The present invention is directed to cooling and climate control systems and methods for an offshore wind turbine that can provide clean, cold, ambient air at a low relative humidity to the turbine. Moreover, the present invention does not interfere with the yawing of the wind turbine nacelle about the vertical axis.

More particularly, the present invention provides systems and methods to cool the air inside the nacelle and the heat generating components of an offshore wind turbine. In one embodiment of the present invention, the ambient air first enters an air handling unit near the tower bottom where the airborne water droplets and salt particles are removed. The clean air is then compressed adiabatically, thus increasing the dew point temperature of the water vapor in the air. The high pressure, high temperature air from the compressor is then cooled and dehumidified in a sea water-to-air heater exchanger or (in another embodiment) an air-to-air heat exchanger. The high pressure air from the heat exchanger then enters the turbine at the tower bottom and flows up to the nacelle where it is allowed to expand adiabatically in a duct. The duct helps direct the resulting cold air over the heat generating components. The warm air ultimately exits the nacelle at the rear top.

Thus, the climate control system of the present invention can provide the wind turbine nacelle with cold air at a low humidity. The system according to this embodiment also uses a freely rotating interface between the nacelle air duct and the stationary high pressure air pipe from the tower bottom, thus permitting the duct to freely yaw with the nacelle.

The present invention according to one embodiment provides a system to cool the air inside the nacelle and the heat generating components of a wind turbine. An air handling unit is adapted to receive ambient air and remove dust, water droplets, and salt particles from the air. A compressor unit is adapted to receive the air from the air handling unit and increase the pressure of the air. A liquid-to-air heat exchanger is adapted to receive the air from the compressor unit and use sea water to cool and dehumidify the air. A pipe unit is disposed in the tower of the turbine and is adapted to receive the air from the heat exchanger and expand the air adiabatically into a duct attached to the nacelle. An interface is disposed between the pipe unit and the duct, the interface being adapted to enable the duct to rotate freely with the nacelle as the nacelle yaws. The duct rotates freely with the nacelle as the nacelle yaws, and the duct directs the resulting cold air into the nacelle.

The present invention according to another embodiment provides a system to cool the air inside the nacelle and the heat generating components of a wind turbine. An air handling unit is adapted to receive ambient air and remove dust, water droplets, and salt particles from the air. A compressor unit is adapted to receive the air from the air handling unit and increase the pressure of the air. An air-to-air heat exchanger is adapted to receive the air from the compressor unit and use ambient air to cool and dehumidify the air. A pipe unit is disposed in the tower of the turbine, and is adapted to receive the air from the heat exchanger and expand the air adiabatically into a duct attached to the nacelle. An interface is disposed between the pipe unit and the duct, the interface being adapted to enable the duct to rotate freely with the nacelle as the nacelle yaws. The duct rotates freely with the nacelle as the nacelle yaws, and the duct directs the resulting cold air into the nacelle.

The present invention according to another embodiment provides a system to cool the air inside the nacelle and the heat generating components of a wind turbine. An air handling unit is adapted to receive ambient air and remove dust, water droplets, and salt particles from the air. A compressor unit is adapted to receive the air from the air handling unit and increase the pressure of the air. A liquid-to-air heat exchanger is adapted to receive the air from the compressor unit and use sea water to cool and dehumidify the air. An expansion valve is adapted to receive the air from the heat exchanger and expand the air adiabatically into the tower, which delivers the resulting cold air into the nacelle. The tower wall is thermally insulated to minimize the heat gained by the air flowing up the tower.

The present invention according to another embodiment provides a system to cool the air inside the nacelle and the heat generating components of a wind turbine. An air handling unit is adapted to receive ambient air and remove dust, water droplets, and salt particles from the air. A compressor unit is adapted to receive the air from the air handling unit and increase the pressure of the air. A liquid-to-air or an air-to-air heat exchanger is adapted to receive the air from the compressor unit and use ambient air to cool and dehumidify the air. A pipe unit is disposed in the tower of the turbine, and is adapted to receive the air from the heat exchanger and expand the air adiabatically into a duct attached to the nacelle. The branches of the duct are either open to the nacelle or directly attached to the heat generating components. The duct thus provides clean, cold air to cool the heat generating components both externally and internally. The duct rotates freely with the nacelle as the nacelle yaws.

The present invention according to another embodiment provides a method to cool the air inside the nacelle and the heat generating components of a wind turbine. The method includes receiving ambient air and removing dust, water droplets, and salt particles from the air; compressing the air; receiving the compressed air and using one of sea water and ambient air to cool and dehumidify the air; receiving the cooled and dehumidified air in a pipe unit disposed in the tower of the turbine and expanding the air from the pipe unit adiabatically into a duct attached to the nacelle; and freely rotating the duct with the nacelle as the nacelle yaws, and directing the resulting cold air from the duct into the nacelle.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will be more readily understood from a detailed description of the exemplary embodiments taken in conjunction with the following figures.

The invention will next be described in connection with certain exemplary embodiments; however, it should be clear to those skilled in the art that various modifications, additions, and subtractions can be made without departing from the spirit and scope of the claims.

DETAILED DESCRIPTION OF THE PREFERRED EMBODIMENTS

According to Dalton's law of partial pressure, the total pressure of a mixture of gases is equal to the sum of all the partial pressures of the component gases. If the total pressure of the gas mixture changes, all the component partial pressures will change in proportion. Ambient air can be considered primarily a mixture of "dry air" and "water vapor." The dew point temperature of water vapor, i.e., the temperature at which the water vapor condenses, is always directly related to the partial pressure of water vapor in the air. When air is compressed, the water vapor pressure increases proportionately, thereby resulting in an increase in the dew point temperature of the water vapor. Moreover, when the air is adiabatically compressed in the compressor, the temperature of the air also increases.

Therefore, when the high pressure, hot air out of the compressor is cooled in a heat exchanger, the water vapor in the air starts to condense if the temperature of the cooling medium is below the dew point temperature of the compressed water vapor. Thus, by compressing the humid ambient air and cooling the resultant high pressure, hot air, a significant amount of water vapor can be removed from the air in the form of water condensate. When the high pressure air is allowed to expand adiabatically to the ambient pressure, the air temperature decreases.

Figure 1:
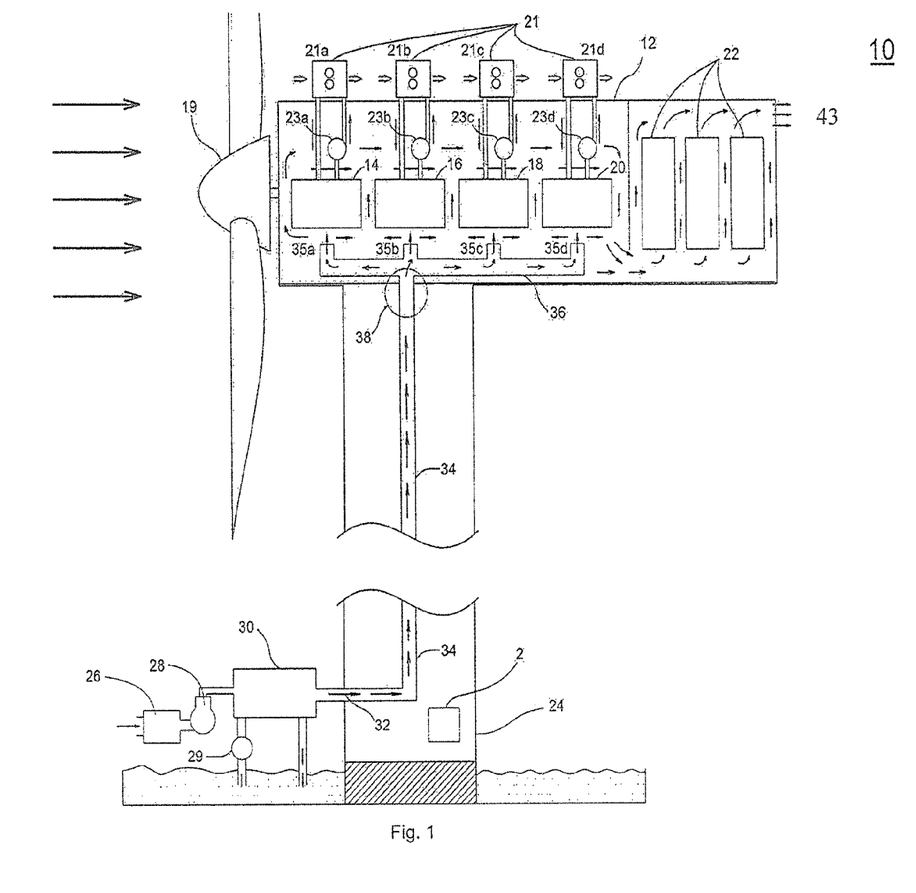
FIG. 1 shows a cooling and climate control system in accordance with an embodiment of the present invention.

FIG. 1 shows an offshore wind turbine having a cooling and climate control system 10 according to one embodiment of the present invention. In FIG. 1, sea water is used for cooling, as described in more detail herein. The system 10 has a rotor 19. A nacelle 12 houses the heat generating components, including the drivetrain (or gear box) 14, the generator 16, the hydraulics unit 18, the converter 20, and the transformer 22. The coolant pumps 23a-d, help circulate the coolant through the heat exchangers or the internal passages of the heat generating components, namely, the gear box 14, the generator 16, the hydraulics 18, and the converter 20, and the corresponding radiators 21a-d, respectively, and thus remove the heat from the components and dissipate it to the ambient air. The cold air from the cooling and climate control system 10 flows over these components and also over the transformer 22, and thus cools these components from the outside.

The system 10 has a tower 24. Near the tower bottom, the ambient air enters an air handling unit 26 comprising air filters and blowers. As the ambient air flows through the air handling unit 26, the dust, water droplets, and salt particles are removed from the air. The clean air then enters a compressor 28 where the air pressure is increased. As noted above, the air compression also increases the temperature of the air exiting the compressor 28. The dew point temperature of the water vapor is also increased due to the increased water vapor pressure. The high pressure, high temperature air from the compressor 28 is cooled and dehumidified by an open flow sea water system in a liquid-to-air heat exchanger 30. The sea water is pumped into the liquid-to-air heat exchanger 30 by pump 29.

The high pressure, low humidity air from the heat exchanger 30 enters the turbine through an inlet 32 at the tower bottom and flows through a pipe or hose 34 to the nacelle 12. The high pressure air is then allowed to expand adiabatically through the expansion valve 37 into a duct 36 attached to the nacelle 12, as shown in FIG. 1. The duct 36 directs the resulting cold air through the air outlets 35a-d over the heat generating components such as the drivetrain 14, the electrical generator 16, the converter 18, and the hydraulic system 20. The air then flows over the transformer 22 and exits the nacelle 12 through an outlet 43 at the nacelle rear top.

Figure 1A:
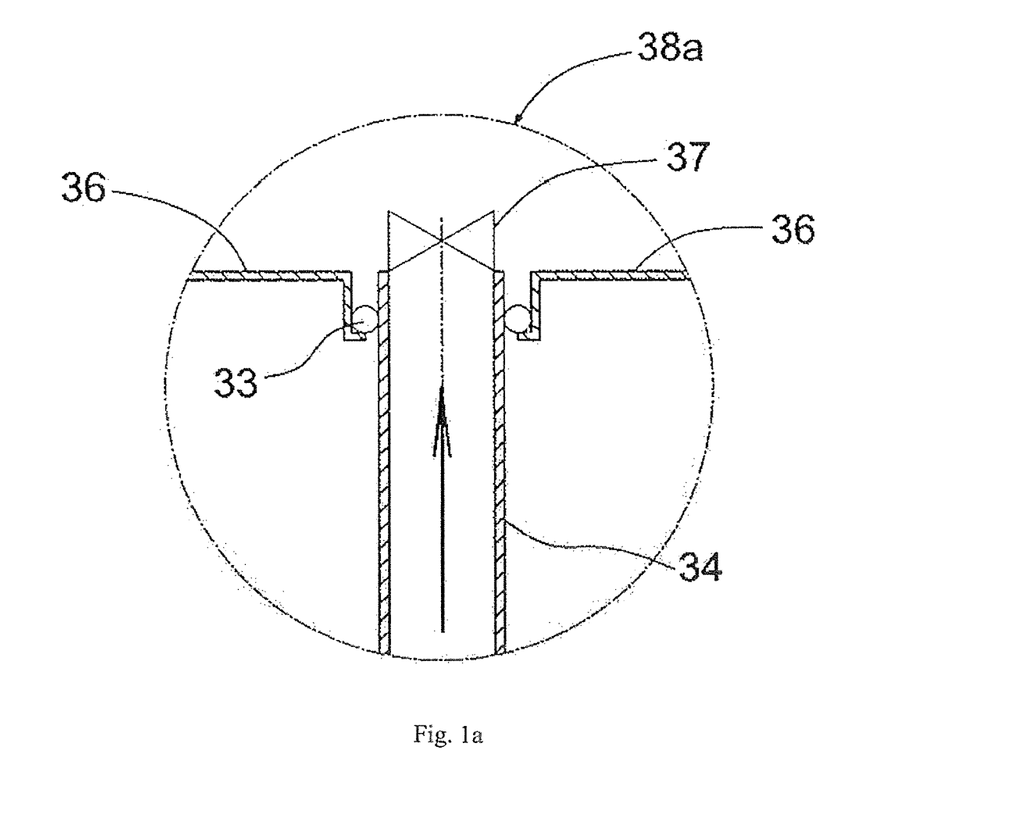
FIG. 1a shows an insert indicating one of the many possible options for an interface between the high pressure hose and the duct in the nacelle for allowing the duct to rotate freely with the nacelle.
Figure 1B:
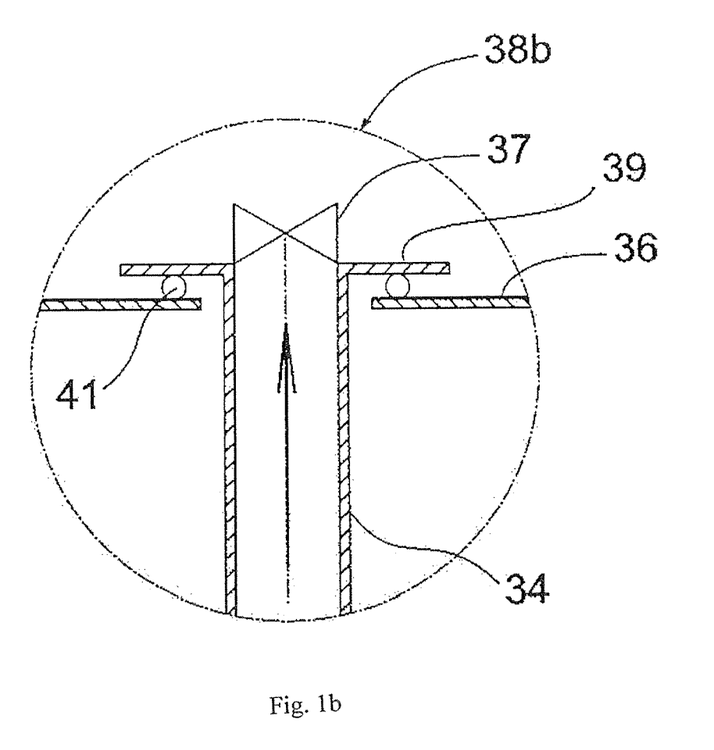
FIG. 1b shows another insert indicating one of the many possible options for an interface between the high pressure hose and the duct in the nacelle for allowing the duct to rotate freely with the nacelle.

The pipe 34 that carries the high pressure air from the tower bottom to the nacelle 12 is attached to the tower 24, and the duct 36 that carries and directs the cold air over the hot spots in the nacelle 12 is attached to the nacelle 12. The vertical axis of the pipe 34 is coincident with the nacelle yaw axis, as shown in FIG. 1. Moreover, the interface 38 between the pipe 34 and the duct 36 is such that the duct 36 is free to rotate with the nacelle 12 as the nacelle 12 yaws to orient the blades towards the wind direction and the pipe 34 is stationary. Two possible options for this interface 38 that permit the duct movement with the nacelle are shown in FIGS. 1a and 1b. Of course, the present invention is not limited to the two options shown.

As the nacelle 12 yaws to direct the blades towards the wind direction to maximize the energy generation, the duct 36 (attached to the nacelle 12) revolves with the nacelle 12 along the axis of the pipe 34 (that is attached to the tower 24 and therefore stationary). In the pipe-duct interface detail shown in the insert 38a in FIG. 1, the outer surface of the air supply pipe 34 acts as a bearing surface around which the duct 36 revolves. The circular bearing 33 between the duct 36 and the pipe outer surface or a similar device allows the duct 36 to be in contact with the pipe 34 but permits circular movement of the duct 36 along the pipe axis.

In the pipe-duct interface shown in insert 38b in FIG. 1, the bottom surface of the circular disc 39 attached to the stationary, air supply pipe 34 acts as a bearing surface between the duct 36 and the pipe 34. A circular bearing 41 between the disc 39 and the duct 36 allows them to be in contact but permits the circular movement of the duct 36 along the axis of the pipe 34.

Thus, the interface 38 is a freely rotating interface disposed between the duct 36 and the pipe 34 from the tower bottom, thereby permitting the duct 36 to freely yaw with the nacelle 12.

The relative humidity of the air inside the tower 24 can be maintained using various options. One option is to use an off the shelf, dehumidifier 2 in the tower 24. Since there is no significant airflow into and out of the tower 24, a fairly small-sized dehumidifier 2 is sufficient to maintain the relative humidity of air inside the tower 24. Another option is to continuously bleed a small volume of air into the tower 24 from the high pressure hose 34 that carries the air to the nacelle 12 (not shown in the figure). This air then flows upwards along the tower 24 and mixes with the air in the nacelle 12.

Thus, in the offshore wind turbine climate control system according to the embodiment shown in FIG. 1, near the tower bottom, the ambient air is compressed and cooled by the sea water. The sea water is pumped through the heat exchanger 30 by pump 29. The clean, high pressure, low temperature and low humidity air is taken to the nacelle 12 and is allowed to expand adiabatically. The cold air then flows over the heat generating components in the nacelle 12. The warm air exits the nacelle 12 through the outlet 43 at the nacelle rear top. FIGS. 1a and 1b, depicting inserts 38a and 38b indicate two of the many possible options for the interface 38 between the high pressure hose 34 and the duct 36 in the nacelle 12 that allow the duct to rotate freely with the nacelle 12.

Figure 2:
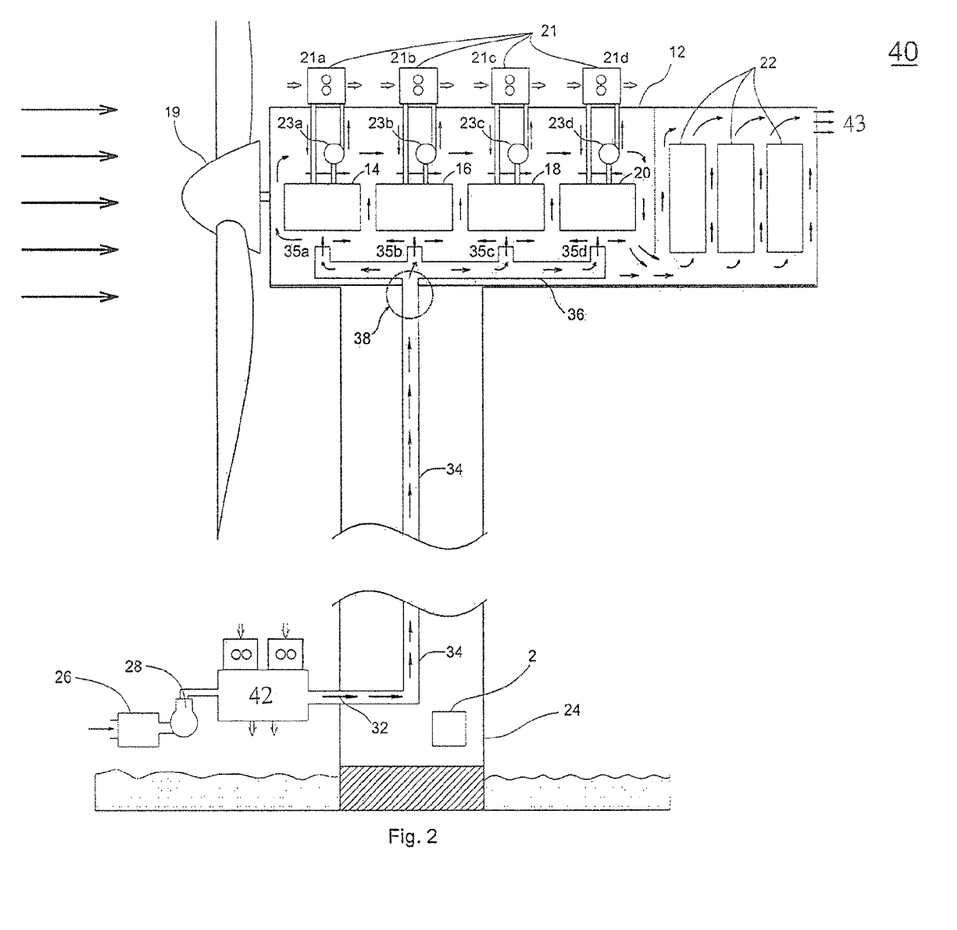
FIG. 2 shows a cooling and climate control system in accordance with another embodiment of the present invention.

FIG. 2 shows another embodiment of a wind turbine climate control system 40 according to the present invention. In the embodiment shown in FIG. 2, the clean, high pressure, and high temperature air is cooled using an air-to-air heat exchanger 42. Thus, instead of using sea water, the ambient air is used to cool and dehumidify the clean high pressure, hot air out of the compressor 28. Otherwise, the system 40 is similar to the system 10 shown in FIG. 1. This embodiment is particularly suited for a land based turbine.

Figure 3:
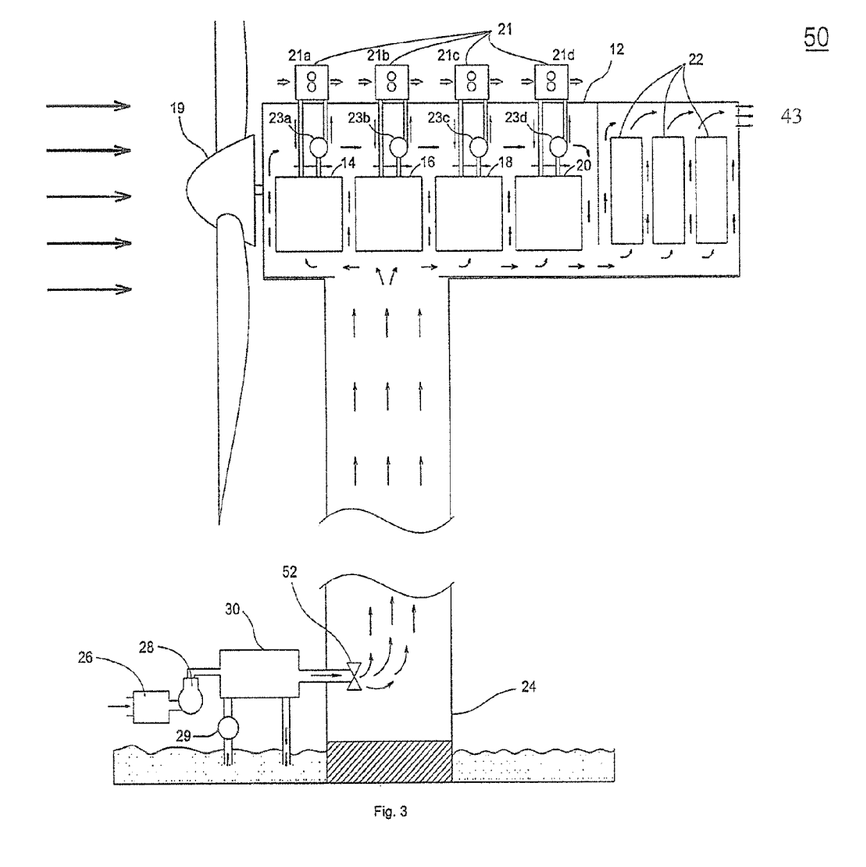
FIG. 3 shows a cooling and climate control system in accordance with another embodiment of the present invention.

FIG. 3 shows another embodiment of a cooling system 50 according to the present invention. Near the tower bottom, the ambient air enters an air handling unit 26 comprising, e.g., air filters and blowers. As the ambient air flows through the air handling unit 26, the dust, water droplets, and salt particles are removed from the air. The clean air then enters a compressor 28 where the air pressure is increased. As noted above, the air compression also increases the temperature of the air exiting the compressor 28. The dew point temperature of the water vapor is also increased due to the increased water vapor pressure. The high pressure, high temperature air from the compressor 28 is cooled and dehumidified by an open flow sea water system in a liquid-to-air heat exchanger 30. The sea water is pumped into the liquid-to-air heat exchanger 30 by pump 29.

In this embodiment, immediately upon entering the turbine at the tower bottom, the high pressure air is allowed to expand through the expansion valve 52. The tower 24 is then used as a duct to carry the clean, low humidity air to the nacelle 12. The tower wall is thermally insulated to minimize the heat gained by the air flowing up the tower 24. This can be done in various ways, including, for example, thermal insulation of the tower surface or an insulating paint. The cold air from the tower flows over the heat generating components such as the drivetrain 14, the electrical generator 16, the converter 18, and the transformer 22 and exits the nacelle through the outlet 43 at the nacelle rear top. The heat generating components are also cooled internally through the circulation of liquid coolant as discussed in the previous embodiments. Since the air flowing through the tower is at a low relative humidity, no additional dehumidifier is needed in the tower section.

Figure 4:
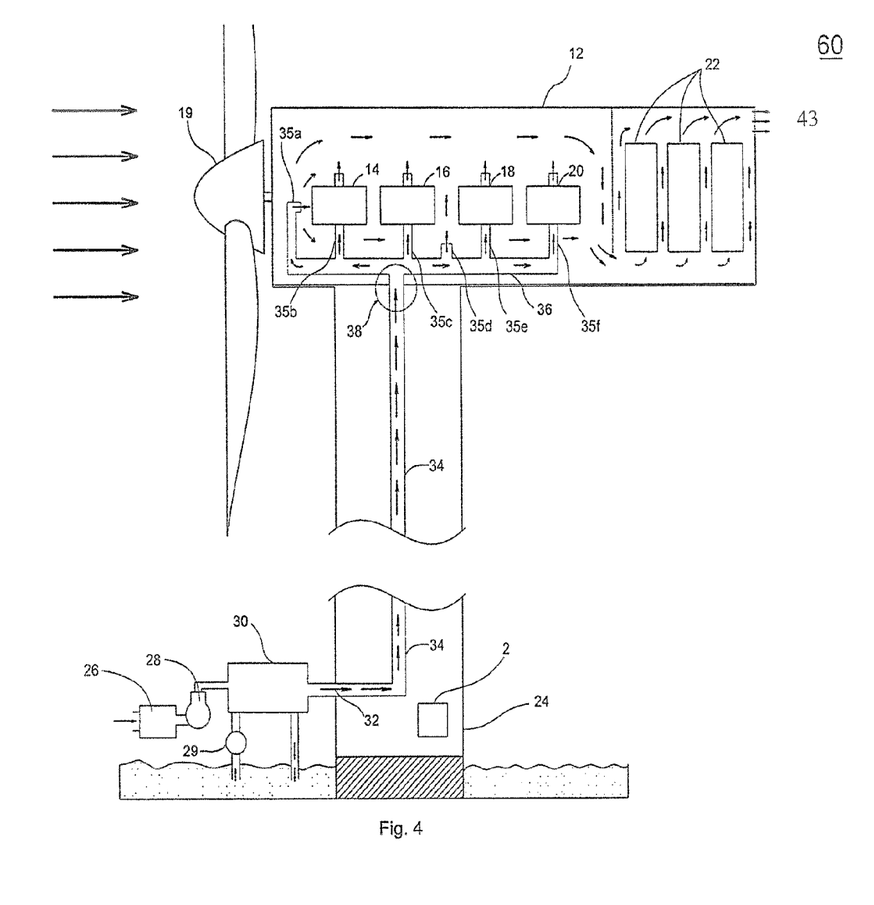
FIG. 4 shows a cooling and climate control system in accordance with another embodiment of the present invention that cools the heat generating components both internally and externally.

In the above embodiments of the invention, the heat generating components of the turbine are cooled internally by the circulation of a liquid coolant and externally by the cold air. FIG. 4 shows another embodiment of the present invention wherein the heat generating components other than the transformer 22 are cooled both internally and externally by the cold air. This is possible because the air flowing in the duct 36 is not only at a low temperature but also has a high velocity. The transformer 22 is cooled only externally by the air.

As in the previous embodiments, a part of the cold air from the duct 36 is directly bled into the nacelle 12 through the duct branches 35a and 35d. The remaining air flows through the components (i.e., the drivetrain 14, the generator 16, the hydraulic system 18, and the converter 20), as discussed below, and exits into the nacelle 12 and mixes with the air from the branches 35a and 35d. The air then flows over the transformer 22 and exits the nacelle 12 through the outlet 43. Thus the heat generating components in the nacelle 12 are cooled externally.

To cool the heat generating components internally, the duct 36 carrying the cold air in the nacelle 12 is connected to the components (i.e., the drivetrain 14, the generator 16, the hydraulic system 18, and the converter 20) directly as shown in FIG. 4. The branches 35b, 35c, 35e, and 35f of the duct 36 connect the respective air cooled heat exchangers (not shown in FIG. 4) internal to these components. Note that the cold air flow through the heat exchangers in the drivetrain 14 and the hydraulic system 18 cools the lubricating oil and the hydraulic fluid, respectively, and thus cools the drive train 14 and the hydraulic system 18. The cold air flowing through the internal passages of the generator 16 and the converter 20 helps cool them internally. The warm air from these heat exchangers or the internal passages of the components exits into the nacelle 12 and combines with the airflow in the nacelle 12 from the duct branches 35a and 35d. The air then flows over the transformer 22 and finally exits the nacelle rear top at the air outlet 43. The airflow in each of the branches (35a to 35f) can be adjusted to maintain the desired internal temperature of the particular component.

As the nacelle 12 yaws to direct the blades towards the wind direction, the previously proposed options (inserts 38a and 38b depicted in FIGS. 1a and 1b, respectively) allow the duct 36 to revolve freely along the axis of the pipe 34. Since the duct branches 35b, 35c, 35e, and 35f are directly connected to the drivetrain 14, the generator 16, the hydraulic system 18 and the converter 20, respectively, it is imperative that the duct 36 has the provision (FIG. 1 inserts 38a and 38b) to freely revolve around the pipe 34.

In this embodiment of the wind turbine cooling and climate control system, the cold air is used to cool the components both internally and externally. As a result, there is no need for any liquid cooling of the components as shown in FIGS. 1 and 2 of the previous embodiments and the associated coolant-to-air radiators on the top of the nacelle 12. This frees up the space on top of the nacelle 12 for the helipad that is used to land the service personnel.

It is noted that although the wind turbine cooling and climate control system of the present invention is preferably directed to an offshore installation, it can also be used in an onshore installation.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above-described exemplary embodiments, but should be defined only in accordance with the following claims and their equivalents.

In addition, it should be understood that the figures illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Furthermore, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

Having described the invention, what is claimed as new and secured by Letters Patent is:

1. A system to cool air inside a nacelle and heat generating components of a wind turbine, comprising:
    an air handling unit adapted to receive ambient air and remove dust, water droplets, and salt particles from the air;
    a compressor unit adapted to receive the air from the air handling unit and increase the pressure of the air;
    a liquid-to-air heat exchanger adapted to receive the air from the compressor unit and use sea water to cool and dehumidify the air; and
    a pipe unit disposed in a tower of the turbine and adapted to receive the air from the heat exchanger and expand the air adiabatically into a duct attached to the nacelle; and
    an interface disposed between the pipe unit and the duct, the interface being adapted to enable the duct to rotate freely with the nacelle as the nacelle yaws,
    wherein the duct rotates freely with the nacelle as the nacelle yaws, and the duct directs the resulting cold air into the nacelle.

2. The system of claim 1, wherein the air handling unit comprises a plurality of air filters and blowers.

3. The system of claim 1, further comprising a pump to pump the sea water into the heat exchanger.

4. The system of claim 1 wherein the vertical axis of the pipe where the pipe meets the duct is coincident with the yaw axis of the nacelle.

5. The system of claim 1, further comprising an expansion valve through which the air is expanded adiabatically into the duct.

6. The system of claim 1, wherein the interface comprises a circular bearing disposed between the duct and the pipe unit thereby enabling circular movement of the duct along the axis of the pipe unit.

7. The system of claim 1, wherein the interface comprises a circular disc attached to the pipe unit to act as a bearing surface between the duct and the pipe unit, and a circular bearing disposed between the circular disc and the duct, thereby enabling circular movement of the duct along the axis of the pipe unit.

8. A system to cool air inside a nacelle and heat generating components of a wind turbine, comprising:
- an air handling unit adapted to receive ambient air and remove dust, water droplets, and salt particles from the air;
- a compressor unit adapted to receive the air from the air handling unit and increase the pressure of the air;
- an air-to-air heat exchanger adapted to receive the air from the compressor unit and use ambient air to cool and dehumidify the air;
- a pipe unit disposed in a tower of the turbine and adapted to receive the air from the heat exchanger and expand the air adiabatically into a duct attached to the nacelle; and
- an interface disposed between the pipe unit and the duct, the interface being adapted to enable the duct to rotate freely with the nacelle as the nacelle yaws,
- wherein the duct rotates freely with the nacelle as the nacelle yaws, and the duct directs the resulting cold air into the nacelle.

9. The system of claim 8, wherein the air handling unit comprises a plurality of air filters and blowers.

10. The system of claim 8, wherein the vertical axis of the pipe where the pipe meets the duct is coincident with the yaw axis of the nacelle.

11. The system of claim 8, further comprising an expansion valve through which the air is expanded adiabatically into the duct.

12. The system of claim 8, wherein the interface comprises a circular disc attached to the pipe unit to act as a bearing surface between the duct and the pipe unit, and a circular bearing disposed between the circular disc and the duct, thereby enabling circular movement of the duct along the axis of the pipe unit.

13. A system to cool air inside a nacelle and heat generating components of a wind turbine, comprising:
- an air handling unit adapted to receive ambient air and remove dust, water droplets, and salt particles from the air;
- a compressor unit adapted to receive the air from the air handling unit and increase the pressure of the air;
- a liquid-to-air heat exchanger adapted to receive the air from the compressor unit and use sea water to cool and dehumidify the air; and
- an expansion valve adapted to receive the air from the heat exchanger and expand the air adiabatically into the tower, which delivers the resulting cold air into the nacelle,
- wherein a tower wall is thermally insulated to minimize the heat gained by the air flowing up the tower.

14. The system of claim 13, wherein the air handling unit comprises a plurality of air filters and blowers.

15. A system to cool air inside a nacelle and heat generating components of a wind turbine, comprising:
- an air handling unit, adapted to receive ambient air and remove dust, water droplets, and salt particles from the air;
- a compressor unit, adapted to receive the air from the air handling unit and increase the pressure of the air;
- a heat exchanger, adapted to receive the air from the compressor unit and use ambient air to cool and dehumidify the air;
- a pipe unit, disposed in a tower of the turbine, and being adapted to receive the air from the heat exchanger and expand the air adiabatically into a duct attached to the nacelle; and
- an interface disposed between the pipe unit and the duct, the interface being adapted to enable the duct to rotate freely with the nacelle as the nacelle yaws,
- wherein the duct has branches which are in one of a state of being (1) open to the nacelle and (2) directly attached to internal passages of the heat generating components, the duct thereby providing clean, cold air to cool the heat generating components both externally and internally.

16. The system of claim 15, wherein the heat exchanger is one of a liquid-to-air or an air-to-air heat exchanger.

17. The system of claim 15, wherein the airflow in the branches of the duct are adjustable to maintain a desired internal temperature of a heat generating component.

18. A method to cool air inside a nacelle and heat generating components of a wind turbine, comprising:
- receiving ambient air and removing dust, water droplets, and salt particles from the air;
- compressing the air;
- receiving the compressed air and using one of sea water and ambient air to cool and dehumidify the air; and
- receiving the cooled and dehumidified air in a pipe unit disposed in a tower of the turbine and expanding the air from the pipe unit adiabatically into a duct attached to the nacelle; and
- freely rotating the duct with the nacelle as the nacelle yaws, and directing the resulting cold air from the duct into the nacelle.

* * * * *